| United States Patent [19] | [11] Patent Number: 4,589,998 |
| Bragg et al. | [45] Date of Patent: May 20, 1986 |

[54] METHOD FOR TREATING OIL-WATER EMULSIONS AND RECOVERING SURFACTANTS

[75] Inventors: James R. Bragg, Houston; Walter W. Gale, Spring, both of Tex.

[73] Assignee: Exxon Production Research Co., Houston, Tex.

[21] Appl. No.: 529,190

[22] Filed: Sep. 6, 1983

[51] Int. Cl.$^4$ .................... C10M 119/10; C09K 3/00
[52] U.S. Cl. ........................... 252/330; 252/8.55 R; 252/328; 252/331; 252/358; 252/346; 252/348
[58] Field of Search ................ 252/8.55 R, 328, 331, 252/358, 330; 166/273–275

[56] References Cited

U.S. PATENT DOCUMENTS 4,182,690  1/1980  Suzuki .................................. 252/358

*Primary Examiner*—Prince E. Willis
*Attorney, Agent, or Firm*—James H. Riley; Karen T. Burleson

[57] ABSTRACT

To improve the separation of a produced oil-water emulsion containing a surfactant, the emulsion parameters of temperature and salinity are brought within certain critical limits. The emulsion will separate into an injectable brine/surfactant phase and a pipeline quality crude oil phase. The operable salinity range is from about 70% to about 130% of the reservoir salinity, and the operable temperature range is from about 75° F. lower to about 75° F. higher than the temperature of the reservoir from which the emulsion was produced.

42 Claims, 2 Drawing Figures

METHOD FOR TREATING OIL-WATER EMULSIONS AND RECOVERING SURFACTANTS

BACKGROUND OF THE INVENTION

1. Field of the Invention

This invention relates to the recovery of petroleum from underground reservoirs and pertains in particular to the breaking of emulsions of crude oil, water, and surfactant that are recovered from a producing well of the reservoir.

2. Description of the Prior Art

The petroleum industry has recognized for many years that only a small fraction of the original oil in place in a reservoir is expelled by natural mechanisms. It is also well known that conventional methods of supplementing natural recovery are relatively inefficient. Typically, a reservoir may retain half of its original oil, even after the application of currently available methods of secondary recovery. Accordingly, there is a continuing need for improved recovery methods that will substantially increase the ultimate yield of petroleum from subterranean reservoirs.

Waterflooding is by far the most economical and widely practiced of secondary recovery methods. In such a process, water is injected through an input well to drive oil from the formation into an offset production well. Most of the current work in secondary recovery technology has been directed toward improving the efficiency of the waterflooding processes.

Surface active agents, or surfactants, are one class of materials that have been proposed for improving the efficiency of waterflooding processes. Much of the oil that is retained in the reservoir after a typical waterflood is in the form of discontinuous globules or discrete droplets that are trapped within the pore spaces of the reservoir. Because the normal interfacial tension between the reservoir oil and water is so high, these discrete droplets are unable to sufficiently deform to pass through narrow constrictions in the pore channels. When surfactants are added to the flooding water, they lower the interfacial tension between the water and the reservoir oil and permit the oil droplets to deform and flow with the floodwater.

In more recent years, a special surfactant flooding medium has developed, namely "microemulsions". A "microemulsion" is defined as a stable, transparent or translucent micellar solution of oil, water, and one or more surfactants. The solution may optionally contain co-surfactants and/or co-solvents.

In those reservoirs that have been subjected to a surfactant-based flood, the recovered liquid from a producing well is usually in the form of an oil-water-surfactant emulsion which is quite stable because of the reduced interfacial tension. Emulsions (not to be confused with microemulsions) are mixtures in which one liquid is uniformly distributed as discrete droplets in another liquid. The petroleum industry has long sought economical and efficient methods for breaking emulsions produced from surfactant-based floods.

Many approaches have been suggested for breaking an oil-water-surfactant emulsion. For example, U.S. Pat. No. 4,029,570 issued to Coffman, et al. on June 14, 1977 teaches contacting the emulsion with formation brine to produce an oil phase and a water phase. Unfortunately, the process is slow and the produced oil phase usually contains unacceptable amounts of water. The generally accepted maximum water content of oil destined for pipeline transmission is less than 1 wt %. Hence, additional treatments to remove the water are necessary before delivering the separated oil to a pipeline.

Another process is disclosed in U.S. Pat. No. 4,261,812 issued to Newcombe on April 14, 1981, where additional brine and surfactant are added to the emulsion. The results are said to be better than in Coffman, but problems still exist. The oil is not pipeline quality, and the surfactant is lost in the oil phase.

Yet another method for breaking produced emulsions is disclosed in U.S. Pat. No. 4,277,352, issued to Allison et al., on July 7, 1981 which involves extracting surfactants from crude oil by using various solubilizers, such as alcohols or phenols. This process requires a long equilibration period which severely limits its usefulness.

Conventional methods for breaking oil-water emulsions are generally unsuccessful in breaking emulsions which contain a microemulsion as one of the components. Further, prior art methods generally do not result in an aqueous surfactant-containing phase that is suitable for reinjection into a formation.

SUMMARY OF THE INVENTION

This invention relates to a method for treating oil-water emulsions produced from microemulsion and surfactant floods. In particular, it relates to a method for breaking oil-water-surfactant emulsions which have as one component a microemulsion that exhibits non-classical phase behavior. This method efficiently and inexpensively separates oil, brine, and surfactant, to produce pipeline quality oil and an injectable brine/surfactant phase.

We have discovered that (1) many produced emulsions include as one component a microemulsion that exhibits non-classical phase behavior and (2) such emulsions can be broken by carefully controlling the temperature and salinity within certain operable ranges. The operable salinity range of a produced emulsion is from about 70% to about 130% of the reservoir salinity. The operable temperature for a produced emulsion is a value that ranges from about 75° F. lower to about 75° F. higher than the reservoir temperature. This value has a variance of about ±5° F., for the chosen salinity. Both the reservoir salinity and the reservoir temperature are known values for any enhanced oil recovery operation.

There are several methods for adjusting the salinity of a produced emulsion to bring it within the operable salinity range. One method for increasing the salinity of the produced emulsion involves the addition of sufficient quantities of salt or water having a salinity greater than 70% of the reservoir salinity to bring the salinity of the produced emulsion within the operable salinity range.

Another method involves heating or cooling the emulsion until most of the microemulsion component is driven from the brine phase causing most of the brine to separate from the oil and microemulsion phases. The brine is discarded, and new brine having salinity greater than 70% of the reservoir salinity is added to bring the overall salinity of the produced emulsion within the operable salinity range. Whether one heats or cools the emulsion depends on the type of surfactant used in the flood. Generally, if the surfactant has an optimal salinity which increases with increasing temperature (a common characteristic of anionic surfactants), the emulsion should be cooled below reservoir temperature. Conversely, if the surfactant has an optimal salinity which decreases with increasing temperature (a common characteristic of nonionic surfactants), the emulsion should be heated above reservoir temperature. Some surfactants have both anionic and nonionic components, and their behavior cannot be generalized.

The salinity of the produced emulsion may occasionally be greater than 130% of the reservoir salinity. In this case, the emulsion can be brought within the operable salinity range by adding sufficient quantities of fresh water or water having salinity less than 130% of the reservoir salinity.

Once the emulsion salinity has been adjusted as required, the temperature is varied within the defined range until it reaches its critical temperature value where the surfactant becomes immiscible with oil and migrates to the brine. This shift allows the oil to readily coalesce. In some cases, the surfactant becomes immiscible in both water and oil, and forms an intermediate surfactant-rich brine phase between the separate oil and water phases.

This method not only produces oil that is pipeline quality, but it also recovers substantially all the surfactant in a brine/surfactant phase.

DETAILED DESCRIPTION OF THE INVENTION

This invention is based in part on the discovery that many emulsions produced during enhanced oil recovery can be efficiently and inexpensively separated into (1) an injectable brine/surfactant phase, and (2) a pipeline quality crude oil phase by carefully controlling the temperature and salinity of the emulsion within certain critical limits. The emulsions that can be broken in the practice of this invention are any oil-water-surfactant emulsions which have as one component a microemulsion that exhibits non-classical phase behavior. Whether the microemulsion component exhibits non-classical phase behavior can be determined by simply observing the phase behavior of the microemulsion component as the temperature or salinity of the emulsion is varied.

Figure 1:
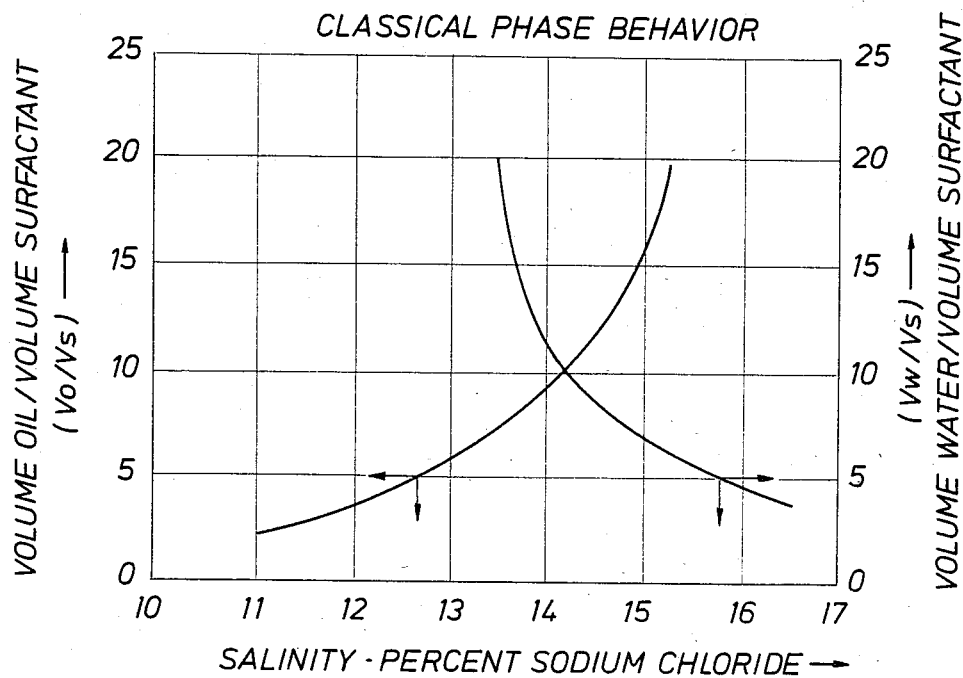
FIG. 1 is a classical phase behavior graph of the volumetric ratio of oil to surfactant in the microemulsion and the volumetric ratio of water to surfactant in the microemulsion expressed as a function of the weight percent of sodium chloride in the water.

FIG. 1 illustrates classical phase behavior for a microemulsion at constant temperature and increasing brine salinity. The oil solubilized in the microemulsion phase monotonically increases, and the brine solubilized in the microemulsion phase monotonically decreases. The salinity at which the volume ratio of oil to surfactant (Vo/Vs) equals the volume ratio of water to surfactant (Vw/Vs) is defined as the optimal salinity. As the salinity increases, a lower-phase microemulsion will become middle-phase in the vicinity of optimal salinity. If the salinity increases past optimal salinity, the microemulsion will become upper-phase.

Figure 2:
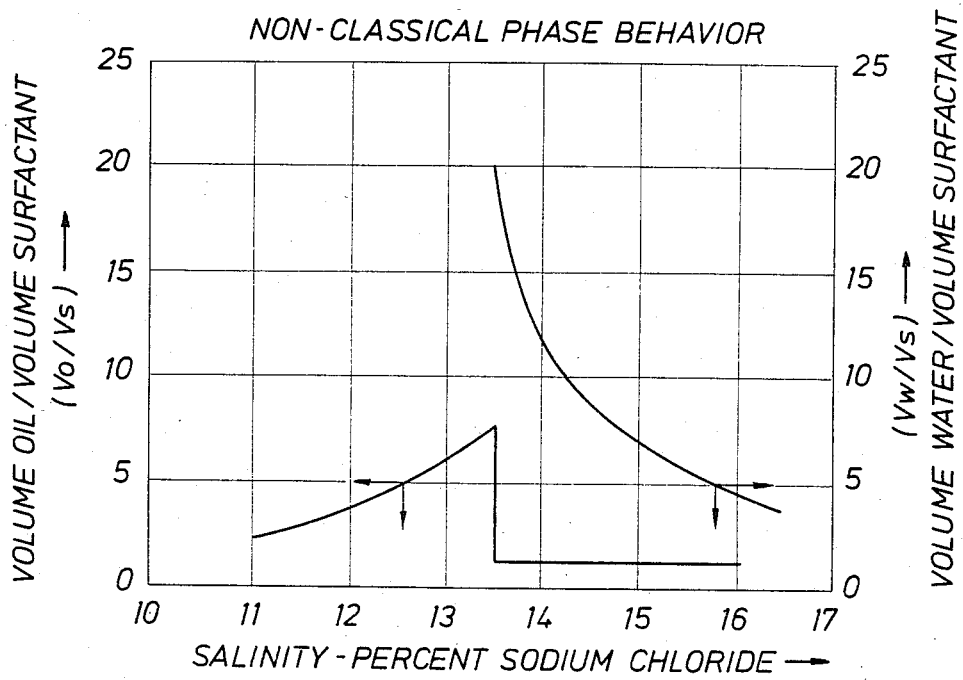
FIG. 2 is a non-classical phase behavior graph depicting the same functions as in FIG. 1.

FIG. 2 illustrates non-classical phase behavior under the same conditions of constant temperature and increasing salinity. As the salinity increases, the volume of solubilized oil increases, as indicated by the increase in Vo/Vs, but at a certain point the oil solubilization decreases substantially, and Vo/Vs remains rather constant at a low value despite further increases in salinity. Microemulsions which exhibit non-classical phase behavior do not appear to have a salinity where equal volumes of oil and brine are solubilized, e.g., optimal salinity.

This invention produces a crude oil phase substantially free of surfactant and a brine phase which contains substantially all of the surfactant. The crude oil containing little or no surfactant or water is a saleable pipeline quality oil or a crude oil which can easily be made pipeline quality by conventional methods. The brine phase containing the recovered surfactant is ready for use in additional oil recovery operations.

Using this invention, the surfactant contained in an emulsion of produced fluids is concentrated in one or more brine phases while its concentration is simultaneously reduced in a crude oil phase. To achieve this, the parameters of temperature and salinity of the emulsion are carefully controlled so that substantially all (ie. more than about 95%) of the surfactant becomes distributed in one or more aqueous phases while little surfactant (i.e. less than about 5%) remains in the oil phase. The oil phase can then be separated from the aqueous phase or phases by simple conventional methods, such as gravity separation followed by further treatments known to those skilled in the art, if desired or necessary. These may include heater treaters, electric coalescers, or various apparatus useful in conventional separating where recovery of surfactant in a reuseable form is not contemplated. The remaining brine/surfactant phase contains generally less than 2% crude oil and is available for reinjection into the reservoir to recover additional oil.

This invention functions well on emulsions produced from both surfactant flooding and microemulsion flooding. A detailed description of microemulsion flooding is contained in U.S. Pat. No. 3,981,361, which issued to R. N. Healy on Sept. 21, 1976 and which is incorporated by reference. For simplicity, the term "surfactant-based flood" will be used to refer to both types of flooding operations.

A surfactant-based flood will produce an emulsion that has one or more microemulsions as part of the emulsion. The microemulsion in a produced emulsion will exist in one of three phases: upper, middle or lower. If the microemulsion is upper-phase, it is immiscible with water. Therefore, most of the surfactant is concentrated in the oil phase while the excess brine is relatively free of oil and surfactant. However, the oil phase contains large amounts of surfactant and solubilized water which are very difficult to remove.

A middle-phase exists when the microemulsion is immiscible in both oil and water. An upper oil phase and a lower brine phase are relatively free of surfactant and components from other phases, but the middle-phase contains most of the surfactant and large amounts of solubilized water and oil.

If the microemulsion is lower-phase, as is the case for most produced emulsions, it is immiscible with oil so it tends to mix with and solubilize brine. A relatively clean oil phase separates from the brine phase, but the brine phase contains a large amount of solubilized oil along with most of the surfactant.

It is known that varying the temperature or salinity of a microemulsion will cause it to change phases, assuming that all other factors remain constant. Regardless of whether the phase change is the result of temperature or salinity variation, classical phase behavior theory teaches that the transition between these phases is continuous, e.g. microemulsions changing from lower-phase to upper-phase (and vice versa) must pass through a middle-phase. For example, if the microemulsion is lower-phase and the surfactant is one whose optimal salinity decreases with increasing temperature, an increase in the temperature will create a middle-phase microemulsion. Further heating forces it to become upper-phase.

Conversely, if a lower-phase microemulsion contains a surfactant whose optimal salinity increases with increasing temperature, a decrease in the temperature will cause the microemulsion to become middle-phase. Further reduction in temperature will create an upper-phase microemulsion.

We have discovered that many produced emulsions contain one or more microemulsion phases that do not exhibit this classical phase behavior because they essentially do not form middle-phase microemulsions containing equal amounts of solubilized brine and oil. As the salinity or temperature of a lower-phase microemulsion approaches the point where a middle-phase would be expected to exist, the solubility of oil in the microemulsion decreases significantly. When this phenomenon occurs, the surfactant enters the brine phase and the oil readily coalesces.

This invention essentially operates by controlling the relevant parameters of temperature and salinity such that the produced emulsion achieves both critical salinity and temperature values. The critical temperature value is defined as the temperature at which oil and brine separate cleanly with the brine containing less than 2% oil and substantially all of the surfactant (in one or more aqueous phases). Similarly, the critical salinity value is defined as the salinity at which oil and brine separate cleanly with the brine containing less than 2% oil and substantially all of the surfactant (in one or more aqueous phases).

Because the parameters of temperature and salinity are interrelated, the precise conditions for separation can be achieved by adjusting the temperature of the emulsion to a critical temperature value while maintaining a fixed salinity within the operable salinity range, by adjusting the salinity of the emulsion to a critical salinity value while maintaining a fixed temperature within the operable temperature range, or by varying both parameters to arrive at critical temperature and salinity values within the operable ranges of salinity and temperature.

The preferred embodiment of this invention involves breaking the emulsion produced from a surfactant-based flood by maintaining the salinity of the produced emulsion within the operable salinity range and adjusting the temperature to the critical temperature value within the operable temperature range where the produced emulsion achieves its fastest separation.

The salinity of a produced emulsion must fall within an operable range which varies from about 70% to about 130% of the reservoir salinity and is preferably substantially equal to its salinity. The reservoir salinity is a known value for any enhanced oil recovery operation. In some reservoirs, however, the reservoir salinity is not constant throughout the reservoir. In these cases, the reservoir salinity referred to in this invention will be understood to mean the range of reservoir salinity, such that, the operable salinity range will be from about 70% of the lowest to about 130% of the highest reservoir salinity.

Once the salinity of the produced emulsion is within the operable range, and most preferably at the reservoir salinity, the temperature of the produced emulsion is adjusted to reach a critical value within a range which is from about 75° F. lower to about 75° F. higher than the reservoir temperature. As with reservoir salinity, reservoir temperature is a known value for enhanced oil recovery operations. If the reservoir temperature is not constant throughout the reservoir, the operable temperature range will be understood to be from about 75° F. lower than the lowest to about 75° F. higher than the highest reservoir temperature. Within this operable temperature range there is a critical temperature value at which separation occurs. The actual temperature may be varied ±5° F. around this value without affecting the quality of the separation.

A preferred operable salinity range is from about 90% to about 110% of the reservoir salinity. When the salinity of the emulsion is within the preferred range, the operable temperature range can be narrowed to about 45° F. below to about 45° F. above the reservoir temperature. The actual temperature value within that range at which the desired separation occurs may still vary ±5° F. about the critical temperature.

An especially preferred salinity is when the salinity of the produced emulsion is fixed at the reservoir salinity. Maintaining a fixed salinity substantially equal to the reservoir salinity has two advantages. First, the operable temperature range is narrowed from about 25° F. below to about 25° F. above the reservoir temperature, making it easier to find the critical temperature value at which separation occurs. Here again, once the emulsion reaches its critical temperature value within the operable temperature range, the actual temperature may be allowed to vary about ±5° F. without affecting the results. Second, the recovered brine/surfactant phase does not require any further salinity adjustment to make it ready for reinjection into the reservoir because the salinity of a surfactant-based flood is usually the same as the reservoir salinity.

There are several methods for treating a produced emulsion that has a salinity outside the operable salinity range. If the produced emulsion has a salinity below the operable salinity range, it can be brought within the operable salinity range by adding sufficient quantities of water having salinity greater than 70% of the reservoir salinity.

Another method for increasing the salinity of a produced emulsion involves adding sufficient amounts of salt to the emulsion to bring the overall salinity of the emulsion within the operable salinity range. Others have added salt to break the emulsion, but these techniques involve adding large quantities of salt to tie up the surfactant and precipitate it out of the emulsion. If salt is added in this invention, it is added in quantities just sufficient to bring the emulsion within the operable salinity range and not to precipitate out the surfactant.

Still another method for increasing the salinity of a produced emulsion of low salinity involves the separation of lower salinity brine from the oil and surfactant. After separation, brine having salinity greater than 70% of the reservoir salinity is added until the produced emulsion has a salinity within the operable salinity range (and preferably close to the reservoir salinity).

The procedure for separating the lower salinity brine involves decreasing the solubility of brine in the microemulsion and depends on the type of surfactant in the emulsion. Generally, if the surfactant has an optimal salinity which decreases with increasing temperature, the emulsion is heated to a sufficiently high temperature ranging from about reservoir temperature to about 100° F. above the reservoir temperature. If the surfactant has an optimal salinity which increases with increasing temperature, the emulsion is cooled to a temperature ranging from about reservoir temperature to about 100° F. below the reservoir temperature. An anionic surfactant is one type of surfactant which usually exhibits increasing optimal salinity as its temperature increases. A nonionic surfactant usually has opposite characteristics.

As the brine becomes less soluble in the microemulsion, it separates from the oil and microemulsion phases and forms a distinct brine phase which can be easily separated by conventional methods. After the brine phase is separated, the remaining oil-rich phase which contains most of the surfactant is contacted with a sufficient volume of new brine having salinity greater than 70% of the reservoir salinity so as to bring the overall salinity of the produced emulsion within the operable salinity range. The formation brine is usually an excellent source of brine having salinity within the operable salinity range.

If the produced emulsion has a salinity above the operable salinity range, it can be brought within the operable salinity range by adding sufficient quantities of fresh water or water having salinity less than 130% of the reservoir salinity.

Once the produced emulsion's salinity is within the operable salinity range, and preferably at the reservoir salinity, the produced emulsion is broken by bringing it to a critical temperature value within the operable temperature range. The precise temperature needed to break the emulsion will depend on the phase behavior of the emulsion's microemulsion component, but at the proper temperature little or no oil will remain in the aqueous phase or phases and little or no surfactant will remain in the oil phase. Usually a few hours in a vessel under quiescent conditions is sufficient to give good separation. As indicated earlier, the closer the salinity of the produced emulsion is to the reservoir salinity, the narrower is the operable temperature range in which separation occurs.

The critical temperature value at which oil, surfactant and brine are separated from a produced emulsion within the operable salinity range specified herein is determined by the following procedure:

1. Several temperature baths are brought to constant temperature within the operable temperature range, each bath differing by 2° F. (i.e., 88°, 90°, 92°, 94°, 96° and 98° F.).
2. Duplicate fresh wellhead emulsion samples of equal volume (~20 cc.) are placed in each bath.
3. Volumes of the phases which separate from the heated emulsion are recorded every 30 minutes until they no longer change.

The quality of the oil phase can be assayed by conventional means. For example, equal volumes of oil phase and hexane can be mixed, and the resultant mixture centrifuged. Any water present will fall to the bottom, and the original water content of the oil phase can be determined. If the water content is greater than 1%, conventional methods (as previously disclosed) can be used to make the oil pipeline quality because almost no surfactant should be present in the oil phase.

The quality of the brine/surfactant phase can be determined by measuring surfactant concentration and comparing it with the overall surfactant content of the produced emulsion. Additionally, oil content of the brine/surfactant phase can be assayed by spectral techniques or by adding a volume of isopropyl alcohol equal to that of the brine/surfactant phase, mixing, and allowing oil rejected from the brine-isopropyl alcohol phase to rise to the top. The volume of the released oil phase should be less than 2% of the volume of the original brine/surfactant phase.

As mentioned earlier, this invention can be practiced by adjusting the salinity of the produced emulsion while maintaining a temperature within the operable temperature range. In this case, the critical salinity value at which oil, surfactant and brine are separated from a produced emulsion within the operable temperature range specified herein is determined by the following procedure:

1. A temperature bath is held at a constant temperature within the operable temperature range (preferably at reservoir temperature).
2. Several fresh wellhead emulsion samples of equal volume (~20 cc) are placed in the bath, each sample being within the operable salinity range and having a salinity variation of 2% (i.e. 96%, 98%, 100%, and 102% of the reservoir salinity).
3. Volumes of the phases which separate from the heated emulsion are recorded every thirty minutes until they no longer change.

If the surfactant is miscible with water, it will be distributed throughout the brine solution and may not ordinarily be of sufficient concentration for reservoir reinjection. Such a dilute brine/surfactant phase can be concentrated, but the procedure will depend on the type of surfactant. Generally, if the surfactant has an optimal salinity which decreases with increasing temperature, it is concentrated by heating the solution to a temperature above the critical temperature. Heat causes this type of surfactant to become immiscible with water and separate into a surfactant-rich phase. The exact temperature at which surfactant concentration occurs may be as high as 100° F. above reservoir temperature, depending on the brine salinity.

Conversely, if the surfactant has an optimal salinity which increases with increasing temperature, it can usually be concentrated by cooling the solution to a temperature below the critical temperature value. Here again, the temperature needed to achieve surfactant concentration will depend on brine salinity, but it may be as low as 100° below reservoir temperature. This process of concentrating the surfactant is beneficial when it is desired to recover the surfactant at a higher concentration for ease in transportation and handling.

The production of a surfactant-rich phase is ideal for staged flooding techniques where a large tract is sequentially flooded. The separated brine/surfactant phase, which is concentrated if necessary, is available for injection into a new injection well to continue the staged flooding. The subsequently produced emulsion can be broken as disclosed herein and the surfactant-rich phase can be reinjected into yet another injection well. This process can continue for as long as needed provided the surfactant lost in the reservoir is replaced prior to reinjection.

Because this invention keys on the phase behavior of the microemulsion in the produced emulsion, it is important to note that other parameters may affect the emulsion produced from a surfactant-based flood. For example, changes in the oil composition, the surfactant blend or the surfactant concentration could affect the phase behavior.

Once the emulsion is produced, it is no longer in its anaerobic environment, and the oil is subject to oxidation which could cause a change in the phase behavior of the microemulsion. For this reason, best results are obtained when the invention is practiced on a freshly produced emulsion (usually less than two hours after production). Of course, if the emulsion is properly preserved under conditions similar to those of its reservoir environment, time should not be a factor.

It is well known that the concentrations of surfactants in a surfactant-based flood can change between the times of injection and production. Usually the concentration is diminished because the surfactant is adsorbed in the formation. One common method to limit the loss of surfactants is to use sacrificial agents as disclosed in U.S. Pat. No. 4,217,958 issued to Doster, et al. This method is effective to some extent in reducing the loss of surfactants, but such loss may still occur.

If the composition or concentration of surfactant in the produced emulsion has significantly changed during the reservoir flooding, the microemulsion within the produced emulsion might appear to exhibit classical phase behavior. When this occurs, sufficient surfactants should be added to restore the surfactant that was lost. Once the surfactant has been added, preferably restoring it to nearly its original concentration, the microemulsion might then exhibit non-classical phase benavior. If the phase behavior is non-classical, the produced emulsion can be broken, as before, by adjusting the salinity and temperature within the operable ranges.

The surfactant concentration may be restored by adding more of the same type of surfactant. Alternatively, as disclosed in U.S. Pat. No. 4,261,812 issued to Newcombe, more quantities of a higher molecular weight surfactant that will be selectively adsorbed by the formation can be added as make-up to restore the surfactant to its original blend. If significant chromatographic separation of lipophilic from hydrophilic components of injected surfactant occurs in transport through the reservoir, the original composition of surfactants can be restored by adding more of one component than the other. In any case, the surfactant will be completely recovered in one or more aqueous phases, and the surfactant-rich aqueous phase will be ready for reinjection into the reservoir to recover more crude oil.

The other parameter that should be considered is the type of surfactant used in the microemulsion flood. This method for breaking produced emulsions is effective with all types of surfactant. Anionic and nonionic surfactants, such as, dodecyl orthoxylene sulfonate and Triton×100, work well, but a bifunction surfactant is preferred. A bifunctional surfactant is defined as a surfactant whose molecular structure has both anionic and nonionic components, such as, Neodol 25-3S and a propane sultone adduct of an ethoxylated Xylenol. An especially preferred surfactant is propoxylated, ethoxylated, tridecyl alcohol sulfate disclosed in U.S. Pat. No. 4,293,428 which is incorporated herein by reference. This particular bifunctional surfactant behaves as a nonionic surfactant because its optimal salinity decreases as temperature increases.

The following examples cited in this application involve the especially preferred surfactant. As previously mentioned, when working with lower-phase microemulsions containing a surfactant whose optimal salinity increases with increasing temperature, the critical temperature value will probably be lower than the reservoir temperature. Furthermore, if the produced emulsion has salinity below the operable salinity range, the lower salinity brine is usually separated by cooling the emulsion below the reservoir temperature.

EXAMPLE #1

An emulsion of oil-water-surfactant was produced from a microemulsion flood pilot test in November 1980. The reservoir temperature was 78° F., the reservoir salinity was 64,000 ppm chlorides, and the surfactant concentration in the injected microemulsion was 2.3%. The produced emulsion had the following composition:

| Components | Concentration |
| --- | --- |
| oil | 15% (vol) |
| brine | 85% (vol) |
| surfactant* | 0.46% |
| chloride content | 50,000 ppm |

*a sulfate of a propoxylated, ethoxylated tridecyl alcohol

This emulsion had a salinity below the preferred operable salinity range and was transformed into an emulsion within the preferred range by heating it to 140° F. for two hours, separating out and discarding the clear brine phase which was equal to 72% of the original emulsion volume, and adding to the oil/surfactant phase two volumes of 64,000 ppm chloride-containing brine. This emulsion was allowed to separate at 90° F. (about 12° F. above reservoir temperature) for two hours. The following phases resulted:

| Upper Oil Phase | |
| --- | --- |
| Concentration of Crude Oil | 98% |
| Concentration of Water | 2% |
| Concentration of Surfactant | 0.08% |
| Lower Brine Phase | |
| Concentration of Surfactant | 0.49% |
| Concentration of Crude Oil | 1.0% |

EXAMPLE #2

An emulsion of oil-water-surfactant was produced from a microemulsion flood pilot test in January, 1983. Again, reservoir temperature was 78° F., the reservoir salinity was 64,000 ppm chlorides, and the surfactant concentration in the injected microemulsion was 2.3%. The produced emulsion had the following composition:

| Components | Concentration |
| --- | --- |
| oil | 22% (vol) |
| brine | 78% (vol) |
| surfactant* | 0.77% |
| chloride content | 61,440 ppm |

*a sulfate of a propoxylated, ethoxylated tridecyl alcohol

This emulsion has a salinity clearly within the preferred operable salinity range. The emulsion was heated to 94° F. resulting in the two phases described below:

| Upper Oil Phase | |
| --- | --- |
| Concentration of Crude Oil | 99% |
| Concentration of Water | 1% |
| Concentration of Surfactant | — |
| (too low to measure) | (less than .05%) |

| -continued | |
|---|---|
| Lower Brine Phase | |
| Concentration of Surfactant | 1.1% |
| Concentration of Oil | 1.2% |

As demonstrated in these examples, this process is extremely efficient and requires only a modest amount of energy to function. It experimentally demonstrates the unexpected substantial improvement over the prior art, and results in reclaimed surfactant in a form which can be used for reinjection into the reservoir.

The principle of the invention and the best mode contemplated for applying that principle have been described. It is to be understood that the foregoing is illustrative only and that other means and techniques can be employed without departing from the true scope of the invention defined in the following claims.

What we claim is:

1. A process for breaking an oil-water-surfactant emulsion comprising crude oil, brine and surfactant, said emulsion being produced from a reservoir having a known reservoir temperature and a known reservoir salinity and having as one component a microemulsion which exhibits non-classical phase behavior, the process which comprises:
   (a) bringing the temperature of the produced emulsion to be within an operable range of about 75° F. below to about 75° F. above said known reservoir temperature, and bringing the salinity of said produced emulsion to be within an operable range of about 70% to about 130% of said known reservoir salinity;
   (b) adjusting said temperature within said operable temperature range or adjusting said salinity within said operable salinity range such that a critical salinity value and a critical temperature value is reached so that most of the surfactant becomes distributed in at least one aqueous phase;
   (c) allowing the crude oil to coalesce into a separate oil phase; and
   (d) separating said oil phase from said aqueous phase.

2. A process as defined in claim 1 wherein the salinity of said emulsion is decreased by adding water having salinity less than 130% of the reservoir salinity.

3. A process as defined in claim 1 wherein the salinity of said emulsion is increased by adding brine having a salinity greater than 70% of the reservoir salinity.

4. A process as defined in claim 1 wherein the salinity of said emulsion is increased by adding inorganic salts.

5. A process as defined in claim 1 wherein said surfactant is an anionic surfactant.

6. A process as defined in claim 1 wherein said surfactant is a nonionic surfactant.

7. A process as defined in claim 1 wherein said surfactant is a bifunctional surfactant.

8. A process as defined in claim 7 wherein said bifunctional surfactant is a sulfate of a propoxylated, ethoxylated tridecyl alcohol.

9. A process as defined in claim 1 wherein the surfactant has an optimal salinity which increases with increasing temperature and the salinity of said emulsion is increased by cooling said emulsion below said reservoir temperature until a brine phase separates, removing said brine phase, and adding a brine having a salinity greater than 70% of the reservoir salinity.

10. A process as defined in claim 1 wherein the surfactant has an optimal salinity which increases with increasing temperature, further comprising concentrating said surfactant in the separate aqueous phase by cooling said aqueous phase to a temperature ranging from about the temperature at which oil separation occurs to about 100° F. below said reservoir temperature and removing a surfactant-rich aqueous phase.

11. A process as defined in claim 1 wherein the surfactant has an optimal salinity which decreases with increasing temperature and the salinity of said emulsion is increased by heating said emulsion above said reservoir temperature until a brine phase separates, removing said brine phase, and adding a brine having a salinity greater than 70% of th salinity of said flood.

12. A process as defined in claim 1 wherein the surfactant has an optimal salinity which decreases with increasing temperature, further comprising concentrating said surfactant in the separate aqueous phase by heating said aqueous phase to a temperature ranging from about the temperature at which oil separation occurs to about 100° F. above said reservoir temperature and removing a surfactant-rich aqueous phase.

13. A process as defined in claim 1 further comprising adding surfactant to the produced emulsion to substantially replace the surfactant lost in the reservoir.

14. A process for breaking an oil-water-surfactant emulsion comprising crude oil, water and surfactant, said emulsion being produced from a reservoir having a known reservoir temperature and a known reservoir salinity and having as one component a microemulsion exhibiting non-classical phase behavior, the process which comprises:
   (a) maintaining the salinity of said emulsion at a constant value within an operable range of from about 70% to about 130% of the reservoir salinity;
   (b) varying the temperature of the emulsion within an operable range of about 75° F. below to about 75° F. above said known reservoir temperature to reach a critical temperature value at which most of the surfactant becomes distributed in at least one aqueous phase;
   (c) maintaining the emulsion within a ±5° F. range about said critical temperature value until the crude oil coalesces into a separate oil phase; and
   (d) separating the crude oil from said aqueous phase.

15. A process as defined in claim 14 wherein said surfactant is an anionic surfactant.

16. A process as defined in claim 14 wherein said surfactant is a nonionic surfactant.

17. a process as defined in claim 14 wherein said surfactant is a bifunctional surfactant.

18. A process as defined in claim 17 wherein said bifunctional surfactant is a sulfate of a propoxylated, ethoxylated tridecyl alcohol.

19. A process as defined in claim 14 wherein the surfactant has an optimal salinity which increases with increasing temperature, further comprising concentrating said surfactant in the separate aqueous phase by cooling said aqueous phase to a temperature ranging form about said critical temperature value to about 100° F. below said reservoir temperature and removing a surfactant-rich aqueous phase.

20. A process as defined in claim 14 wherein the surfactant has an optimal salinity which decreases with increasing temperature, further comprising concentrating said surfactant in the separate aqueous phase by heating said aqueous phase to a temperature ranging from about said critical temperature value to about 100°

F. above said reservoir temperature and removing a surfactant-rich aqueous phase.

21. A process as defined in claim 14 further comprising adding surfactant to the emulsion to substantially replace the surfactant lost in the reservoir.

22. A process for breaking an oil-water-surfactant emulsion comprising crude oil, water and surfactant, said emulsion being produced from a reservoir having a known reservoir temperature and a known reservoir salinity and having as one component a microemulsion exhibiting non-classical phase behavior, the process which comprises:
   (a) maintaining the salinity of said emulsion at a constant value within a range of from about 90% to about 110% of the reservoir salinity;
   (b) varying the temperature of the emulsion within a range of about 45° F. below to about 45° F. above said known reservoir temperature to reach a critical temperature value at which most of the surfactant becomes distributed in at least one aqueous phase;
   (c) maintaining the emulsion within a ±5° F. range about said critical temperature value until the crude oil coalesces into a separate oil phase; and
   (d) separating the crude oil from said aqueous phase.

23. A process as defined in claim 22 wherein said surfactant is an anionic surfactant.

24. A process as defined in claim 22 wherein said surfactant is a nonionic surfactant.

25. A process as defined in claim 22 wherein said surfactant is a bifunctional surfactant.

26. A process as defined in claim 25 wherein said bifunctional surfactant is a sulfate of a propoxylated, ethoxylated tridecyl alcohol.

27. A process as defined in claim 22 wherein the surfactant has an optimal salinity which increases with increasing temperature, further comprising concentrating said surfactant in the separate aqueous phase by cooling said aqueous phase to a temperature ranging from about said critical temperature value to about 100° F. below said reservoir temperature and removing a surfactant-rich aqueous phase.

28. A process as defined in claim 22 wherein the surfactant has an optimal salinity which decreases with increasing temperature, further comprising concentrating said surfactant in the separate aqueous phase by heating said aqueous phase to a temperature ranging from about said critical temperature value to about 100° F. above said reservoir temperature and removing a surfactant-rich aqueous phase.

29. A process as defined in claim 22 further comprising adding surfactant to the emulsion to substantially replace the surfactant lost in the reservoir.

30. A process for breaking an oil-water-surfactant emulsion comprising crude oil, water and surfactant, said emulsion being produced from a reservoir having a known reservoir temperature and a known reservoir salinity and having as one component a microemulsion that exhibits non-classical phase behavior, the process which comprises:
   (a) fixing the salinity of the emulsion at a salinity that is substantially equal to the reservoir salinity;
   (b) varying the temperature of the emulsion within a range of about 25° F. below to about 25° F. above said known reservoir temperature until a critical temperature value is reached at which most of the surfactant becomes distributed in at least one aqueous phase;
   (c) maintaining the emulsion within a ±5° F. range about said critical temperature value until the crude oil coalesces into a separate oil phase; and
   (d) separating the crude oil from said aqueous phase.

31. A process as defined in claim 30 wherein said surfactant is an anionic surfactant.

32. A process as defined in claim 30 wherein said surfactant is a nonionic surfactant.

33. A process as defined in claim 30 wherein said surfactant is a bifunctional surfactant.

34. A process as defined in claim 33 wherein said bifunctional surfactant is a sulfate of a propoxylated, ethoxylated tridecyl alcohol.

35. A process as defined in claim 30 wherein the surfactant has an optimal salinity which increases with increasing temperature, further comprising concentrating said surfactant in the separate aqueous phase by cooling said aqueous phase to a temperature ranging from about said critical temperature value to about 100° F. below said reservoir temperature and removing a surfactant-rich phase.

36. A process as defined in claim 30 wherein the surfactant has an optimal salinity which decreases with increasing temperature, further comprising concentrating said surfactant in the separate aqueous phase by heating said aqueous phase to a temperature ranging from about said critical temperature value to about 100° F. above said reservoir temperature and removing a surfactant-rich aqueous phase.

37. A process as defined in claim 30 further comprising adding surfactant to the emulsion to substantially replace the surfactant lost in the reservoir.

38. A process for breaking an oil-water-surfactant emulsion comprising crude oil, water and surfactant, said emulsion being produced from a reservoir having a known reservoir temperature and a known reservoir salinity and having as one component a microemulsion exhibiting non-classical phase behavior, the process which comprises:
   (a) maintaining the temperature of the emulsion at a constant value within an operable range of about 75° F. below to about 75° above said known reservoir temperature;
   (b) varying the salinity of said emulsion within an operable range of from about 70% to about 130% of the salinity of said known reservoir salinity to reach a critical salinity value at which most of the surfactant becomes distributed in at least one aqueous phase;
   (c) allowing the crude oil to coalesce into a separate oil phase; and
   (d) separating the crude oil from said aqueous phase.

39. A process as defined in claim 38 wherein the salinity of said emulsion is decreased by adding water having salinity less than 130% of the reservoir salinity.

40. A process as defined in claim 38 wherein the salinity of said emulsion is increased by adding brine having a salinity greater than 70% of the reservoir salinity.

41. A process as defined in claim 38 wherein the salinity of said emulsion is increased by adding inorganic salts.

42. A process as defined in claim 1 wherein both said temperature and said salinity are adjusted within their said respective operable ranges.

* * * * *